United States Patent Office 3,734,905
Patented May 22, 1973

3,734,905
PROCESS FOR THE PREPARATION OF NAPH-THOYLENEBENZIMIDAZOLIUM DYESTUFFS
René Pierre Victor Roe, Rouen, André Adolphe René Levavasseur, Sotteville les Rouen, Robert Frederic Michel Sureau, Enghien les Bains, and Marie-Josephe Jeanne Alicot, Soisy Sous Montmorency, France, assignors to Ugine Kuhlmann, Paris, France
No Drawing. Filed July 23, 1970, Ser. No. 57,753
Claims priority, application France, July 23, 1969, 6925113
Int. Cl. C07d 57/02
U.S. Cl. 260—247.2 A          6 Claims

ABSTRACT OF THE DISCLOSURE

A process for the manufacture of naphthoylenebenzimidazolium dyestuffs which comprises condensing, in the presence of acetic acid or one of its higher homologues and of iron, a naphthalic acid anhydride which may be substituted by one or more atoms of chlorine or bromine, by one or two hydroxy groups, by one or two O—Y groups, Y representing an alkyl, aralkyl or aryl group, or by a tertiary amino group, with a secondary amine of the formula:

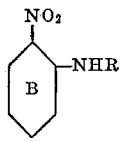

(IV)

wherein the nucleus B may be substituted by chlorine or bromine atoms, methyl, O—Y, nitrile or trifluoromethyl groups and wherein R represents an alkyl, substituted alkyl or aralkyl group. These dyestuffs are useful for the colouration of polymers or copolymers of acrylonitrile.

---

The present invention concerns a process for the preparation of naphthoylenebenzimidazolium dyestuffs.

U.S. Pat. No. 3,459,489 describes and claims dyestuffs and mixtures of dyestuffs of the following formula:

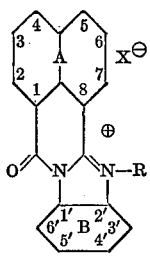

(I)

wherein the naphthalene nucleus A may be unsubstituted or substituted by one or two chlorine or bromine atoms, one or two hydroxy groups or one or two O—Y groups in which Y represents an alkyl, aralkyl or aryl group, preferably methyl or ethyl, the benzene nucleus B may be unsubstituted or substituted by one or more chlorine or bromine atoms or methyl, nitrile, trifluoromethyl or O—Y groups, Y having the same significance as above, one at least of the nuclei A and B being substituted, R represents an alkyl or aralkyl group and X represents a monovalent anion.

The dyestuffs of Formula I may be obtained, for example, by quaternisation at a temperature of 100° C. to 180° C. inclusive by means of an alkylating agent, possibly in the presence of an organic solvent, of derivatives of naphthoylenebenzimidazole of the formula:

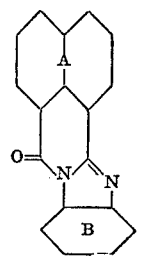

(II)

in which the substituents of A and B are as defined in Formula I.

The dyestuffs of Formula II may themselves be prepared by the condensation of naphthalic anhydride or its substituted derivatives with o-phenylene-diamine or its substituted derivatives. It is known that, in the case of the substituted derivatives, this condensation generally provides a mixture of isomers. Two isomers are formed if only one of the nuclei A and B is substituted, and there are four theoretically possible isomers if the two nuclei A and B are substituted. The case of a symmetrical polysubstitution of A or B by identical substituents goes back to the case of unsubstituted derivatives.

An attempt to reduce the number of isomers to 1 or 2 has been made by a selective synthesis fixing the position of the substituent or substituents of the nucleus B. This result can be obtained by quaternising a dyestuff corresponding to Formula II, prepared by condensing naphthalic anhydride or its substituted derivatives with a substituted o-nitraniline, reducing the nitro group and cyclisation, these two last phases being able to be effected simultaneously.

Although easy to carry out in the laboratory, this synthesis nevertheless encounters difficulties on the industrial scale. The condensation of a substituted o-nitraniline with naphthalic anhydride is effected by fusion, in the absence of solvent, of the reaction mixture and the reaction only starts at about 240° C. When applied to large quantities, there is a risk of it becoming violent until explosive decomposition occurs. On the other hand, the quaternisation of the dyestuffs of Formula II, which is relatively easy if it is a question of fixing a methyl radical to the nitrogen, becomes difficult, and even impossible when the alkyl radical is heavier or is substituted.

We have now found a new synthesis of the dyestuffs of Formula I, enabling these compounds to be easily obtained individually without isomers. This synthesis also enables one to prepare dyestuffs of the formula:

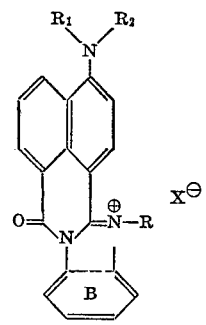

(III)

wherein B is unsubstituted or substituted as defined in Formula I, R represents an alkyl, substituted alkyl or aralkyl group, $R_1$ represents an alkyl group possibly substituted by alkoxy, nitrile or trifluoromethyl radicals and $R_2$ represents an alkyl group possibly substituted by alkoxy, nitrile or trifluoromethyl groups or a phenyl group possibly substituted by halogen atoms or alkyl, alkoxy, trifluoromethyl or nitrile groups, or $R_1$ or $R_2$ together with the nitrogen atom to which they are linked form a heterocyclic nucleus, and X represents a monovalent anion.

According to the present invention therefore a process is provided for the manufacture of naphthoylenebenzimidazolium dyestuffs which comprises condensing, in the presence of aqueous acetic acid or one of its higher homologues and of iron, a naphthalic acid anhydride which may be substituted by one or more atoms of chlorine or bromine, by one or two hydroxy groups, by one or two O—Y groups, Y representing an alkyl, aralkyl or aryl group, or by a tertiary amino group, with a secondary amine of the formula:

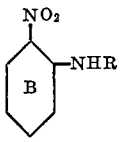

(IV)

wherein the nucleus B may be substituted by chlorine or bromine atoms, methyl, O—Y, nitrile or trifluoromethyl groups and wherein R represents an alkyl, substituted alkyl or aralkyl group.

The alkyl group R may be substituted, for example, by hydroxy, alkoxy or nitrile groups and the acid used is preferably acetic acid.

By means of the process of this invention it is possible to obtain in a single operation a quaternary dyestuff which, when acetic acid is used, has the formula:

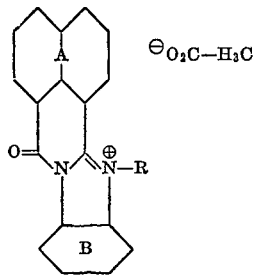

(V)

The preparation of the secondary amines of the Formula IV is known and enables the nature of R to be varied easily within very wide limits. On the other hand, the nascent amino group arising from the reduction of the nitro group in the midst of the mass condenses easily with the anhydride function.

If one wishes to obtain dyestuffs falling within Formula III then one can use a naphthalic anhydride of the formula:

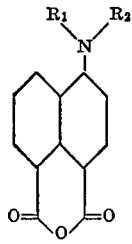

(VI)

in which $R_1$ represents an alkyl group possibly substituted by alkoxy, nitrile or trifluoromethyl radicals and $R_2$ represents an alkyl group possibly substituted by alkoxy nitrile or trifluoromethyl groups or a phenyl group possibly substituted by halogen atoms or alkyl, alkoxy, trifluoromethyl or nitrile groups or $R_1$ and $R_2$ being able to form a heterocyclic ring, such as a piperidyl or morpholinyl ring, with the nitrogen atoms to which they are attached.

The titre of the aqueous acid used as a reaction medium may be selected between 40% and 98%, preferably between 90% and 95%, by weight.

The iron, preferably fine iron powder, may be used in excess. However, it is advantageous to use a quantity leading at the end of the reaction to a basic iron acetate very sparingly soluble in aqueous medium.

The reaction may be effected at very variable temperatures. It is preferably carried out at between 90° C. and the boiling temperature of the acid used as reaction medium.

In order to isolate the dyestuff, it is sufficient, for example, to dilute the reaction mass with boiling water, filter off the sludge of basic iron acetate and add variable amounts of sodium chloride to the filtrate in order to precipitate the dyestuffs as the chloride.

The dyestuffs of this invention are useful for the colouration of polymers or copolymers of acrylonitrile in full-bodied shades having good general fastness, especially to light.

In the following examples which are purely illustrative the parts are parts by weight unless the contrary is stated.

EXAMPLE 1

Preparation of 5′-methoxy-N-methyl-naphthoylene-benzimidazolium chloride 30 parts of 4-N-methylamino-3-nitro-anisole and 33 parts of naphthalic anhydride are introduced into 200 parts of 95% acetic acid. The mixture is heated to 90° C. and 23 parts of iron powder are introduced in the space of about an hour. The reaction is exothermic and the temperature is maintained at about 100° C. It is heated further for two hours, at 100°–105° C., then diluted with 500 parts of water, stirred for 10 minutes and filtered in order to separate the insoluble basic iron acetate. The precipitate is rinsed and 50 parts of sodium chloride are added to the filtrate. The 5′-methoxy-N-methyl-naphthoylene-benzimidazolium chloride crystallises and is filtered off and taken up in 1000 parts of water at 80° C. 2 parts of decolourising charcoal are added to the solution obtained, the mixture is stirred for 10 minutes, filtered and 50 parts of sodium chloride are added to the filtrate. It is left to cool to the ambient temperature while stirring, filtered, and the solid rinsed with a 5% solution of sodium chloride, then with a little ice water, drained and dried at 60° C. to 80° C. 52 parts of a very pure dyestuff, which represents a yield of 90%, are thus obtained.

For analysis, it is recrystallised in water and for $C_{20}H_{15}ClN_2O_2H_2O$ the results are as follows: Calcd. (percent): C, 65.2; H, 4.07; N, 7.60; Cl, 9.64; $H_2O$, 4.48. Found (percent): C, 64.7; H, 4.42; N, 7.44; Cl, 9.50; $H_2O$, 5.00.

This dyestuff dyes fibres based on acrylonitrile polymers a bright green yellow shade, full-bodied and very fast, especially to light.

EXAMPLE 2

Preparation of 4′-methoxy-N-methyl-naphthoylene-benzimidazolium chloride

On replacing in Example 1 the 4-N-methylamino-3-nitroanisole by an equal quantity of its isomer, 3-N-methylamino-4-nitro-anisole, under identical conditions the 4′-methoxy isomer of the dyestuff described in Example 1 is obtained. It dyes polyacrylic fibres in a shade similar to that of the dyestuff of Example 1.

EXAMPLE 3

Preparation of 5′-methoxy-4-(or 5-)bromo-N-methyl-naphthoylene-benzimidazolium chloride This product is obtained by replacing the 33 parts of naphthalic anhydride in Example 1 by 56 parts of 4-bromo-naphthalic anhydride. It is in the form of orange needles.

Results of analysis after recrystallisation from water, for $C_{20}H_{14}ClBrN_2O_2 + 7.50\%$ $H_2O$: Calcd. (percent): C, 54.4; H, 3.05; N, 6.10; Cl+Br (in mol), 2.0 mol. Found (percent): C, 54.0; H, 3.08; N, 6.30; Cl+Br (in mol), 1.92.

EXAMPLE 4

Preparation of 5'-methoxy-N-benzylnaphthoylene-benzimidazolium chloride

The operation is as in Example 1 with the following quantities: 37 parts of naphthalic anhydride, 43 parts of 4-N-benzylamino-3-nitro-anisole, 300 parts of 95% acetic acid and 23 parts of iron powder. The crude dyestuff is taken up in 1500 parts of boiling water containing 3 parts of decolourising charcoal. The dyestuff is precipitated by adding to the filtrate 200 parts by volume of concentrated hydrochloric acid. The crystalline dyestuff is filtered off, washed with a 5% solution of sodium chloride and then with very little ice water. Weight obtained after drying: about 50 parts. Yield about 70%.

A sample recrystallised from water gave the following analysis results for $C_{26}H_{19}ClN_2O_2 3H_2O$: Calcd. (percent): C, 64.9; H, 5.2; N, 5.82; Cl, 7.28; $H_2O$, 12.6. Found (percent): C, 65.1; H, 4.59; N, 5.75; Cl, 7.46; $H_2O$, 10.6.

This dyestuff dyes acrylic fibres in a bright green yellow, full-bodied shade, very fast especially to light.

EXAMPLE 5

Preparation of 5'-methoxy-N-β-cyanoethylnaphthoylene-benzimidazolium chloride This dyestuff is obtained by operating as in Example 1 with 12 parts of 4-N-β-cyanoethylamino-3-nitro-anisole, 13 parts of naphthalic anhydride, 66 parts by volume of 95% acetic acid and 7.6 parts of iron.

It dyes acrylic fibres in a remarkably bright green yellow shade, which is fast especially to light.

The 4-N-β-cyanoethylamino-3-nitro-anisole used may be prepared in the following way:

16.8 parts of 2-nitro-4-methoxy-aniline are dissolved in 50 parts by volume of dioxan. 5 parts by volume of a 10% methanolic solution of tetrabutylammonium hydroxide are added and then gradually, at 40° C., 30 parts by volume of acrylonitrile.

The mixture is stirred for 3 hours at 40° C. After standing for 16 hours at ambient temperature, about two-thirds of the solvent is distilled off in vacuum. The residue is cooled to 10° C., filtered, and the deep red crystalline precipitate is drained washed with alcohol. After drying 15.5 parts are obtained.

For analysis it is recrystallised from dichloroethane at the rate of 1 part to 5 parts of solvent. The product obtained melts at 105° C. Calcd. for $C_{10}H_{11}N_3O_3$ (percent): C, 54.28; H, 4.97; N, 19.01. Found (percent): C, 54.6; H, 5.62; N, 18.8.

The following table gives other examples of products prepared as in Example 1.

TABLE I

| Example | R | Substituent of— A | B | Shades on polyacrylic fibres |
|---|---|---|---|---|
| 6 | Methyl | | 5'-chloro | Pale yellow. |
| 7 | do | | 5'-methyl | Do. |
| 8 | Ethyl | | do | Do. |
| 9 | Methyl | | 5'-bromo | Do. |
| 10 | do | 5- or 4-methoxy | 5'-methoxy | Intense green yellow. |

EXAMPLE 11

Preparation of 5- (or 4-) morpholino-5'-methoxy-N-methyl-naphthoylene-benzimidazolium chloride A mixture comprising 60 parts of 4-morpholino-naphthalic anhydride, 36 parts of 4-N-methylamino-3-nitro-anisole and 700 parts of 95% acetic acid is heated under slight reflux. About 27 parts of iron powder are introduced in small fractions in the space of about an hour. Heating under reflux is continued for 2 hours, 2500 parts of hot water are added and the product is filtered at the boil. 150 parts of sodium chloride are added to the filtrate and the mixture is left to cool. The precipitated dyestuff if filtered off, rinsed with a 5% solutoin of sodium chloride, drained and dried. 85 parts of a dyestuff which dyes polyacrylic fibres in a full-bodied, extremely luminous, vermilion shade are thus obtained.

For analysis it is recrystallized from hydrochloric water, then twice from ethanol. Calcd. for $C_{24}H_{22}ClN_3O_3$, $2H_2O$ (percent): C, 61.1, H, 5.51; N, 8.91; Cl, 7.53. Found (percent): C, 61.1; H, 6.26; N, 8.87; Cl, 8.26.

The 4-morpholino-naphthalic anhydride may be prepared in the following way: 83.1 parts of 4-bromo-naphthalic anhydride and 103.2 parts of morpholine are heated at 150° C. for 2 hours. After cooling to 90° C., 450 parts of water are added, the mixture is heated for some moments, filtered hot in order to separate traces of insoluble matter and the filtrate is acidified by the addition of 75 parts by volume of concentrated hydrochloric acid. The precipitates is filtered off, washed with water until bromine ions have been eliminated from the filtrate, drained and dried. 84.7 parts of a product are obained which is recrystallised from acetic anhydride. The product thus obtained melts at 228–229° C. (Maquenne block).

Analysis.—Calcd. for $C_{16}H_{13}NO_4$ (percent): C, 67.85; H, 4.59; N, 4.94. Found (percent): C, 67.8; H, 4.22; N, 4.79.

The following table illustrates other examples of products prepared by the process of Example 11.

TABLE II

| Ex. | R | Substituent of— A | B | Shades on acrylic fibres |
|---|---|---|---|---|
| 12 | Methyl | 5- or 4-morpholino | 5'-bromo | Bright scarlet. |
| 13 | do | do | 5'-chloro | Bright vermilion. |
| 14 | do | do | 5'-methyl | Bright coral. |
| 15 | do | 5- or 4-(2,6-eimethyl-morpholino) | | |
| 16 | do | 5- or 4-morpholino | 5'-methoxy | Bright vermilion |
| 17 | do | 5- or 4-(2,6-dimethyl-morpholino) | do | Do. |

What is claimed is:

1. A process for the manufacture of naphthoylene-benzimidazolium dyestuffs which comprises condensing, in the presence of aqueous acetic acid and of iron, a naphthalic acid anhydride of the formula:

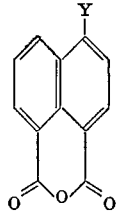

whreein Y is hydrogen, bromine, chlorine, methoxy, morpholino or 2,6-dimethylmorpholino, with a secondary amine of the formula:

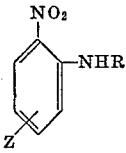

wherein Z is hydrogen, bromine, methyl or methoxy and R is methyl, ethyl, 2-cyanoethyl or benzyl.

2. A process according to claim 1 wherein said aqueous acid having a titre between 90% and 95% is used as the reaction medium.

3. A process according to claim 1 wherein the amount of iron is sufficient to give a very sparingly water-soluble basic iron acetate at the end of the reaction.

4. A process according to claim 1 wherein the reaction is effected at between 90° C. and the boiling point of the acid used as the reaction medium.

5. A process for the manufacture of napthoylene-benzimidazolium dyestuffs which comprises condensing, in the presence of aqueous acetic acid and of iron, a naphthalic acid anhydride of the formula:

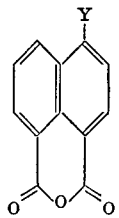

wherein Y is hydrogen, bromine, chlorine, methoxy, morpholino or 2,6-dimethylmorpholino, with a secondary amine of the formula:

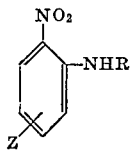

wherein Z is hydrogen, bromine, chlorine, methyl or methoxy and R is methyl, ethyl, 2-cyanoethyl or benzyl, diluting the reaction mass with boiling water, filtering and adding sodium chloride to the filtrate to precipitate the dyestuff as chloride.

6. A process according to claim 1 wherein the aqueous acid has a titre between 40% and 98% by weight.

References Cited
UNITED STATES PATENTS

| | | | |
|---|---|---|---|
| 1,690,775 | 1/1928 | Eckert | 260—282 |
| 3,051,711 | 8/1962 | Graser | 260—282 |
| 3,459,489 | 8/1969 | Sureau et al. | 260—282 X |
| 3,558,617 | 1/1971 | Sureau et al. | 260—282 X |
| 3,586,677 | 6/1971 | Sureau et al. | 260—282 X |
| 3,637,708 | 1/1972 | Peter | 260—282 |

DONALD G. DAUS, Primary Examiner

U.S. Cl. X.R.

260—282